(12) United States Patent
Li (10) Patent No.: US 11,150,790 B2
(45) Date of Patent: Oct. 19, 2021

(54) APPLICATION INTERFACE MANAGEMENT METHOD AND APPARATUS

(71) Applicant: ADVANCED NEW TECHNOLOGIES CO., LTD., Grand Cayman (KY)

(72) Inventor: Bin Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/133,095

(22) Filed: Dec. 23, 2020

(65) Prior Publication Data

US 2021/0117059 A1 Apr. 22, 2021

Related U.S. Application Data

(63) Continuation of application No. 16/389,105, filed on Apr. 19, 2019, now Pat. No. 10,877,640, which is a (Continued)

(30) Foreign Application Priority Data

Oct. 20, 2016 (CN) .......................... 201610916488.1

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0486* (2013.01); *G06F 3/0488* (2013.01); *G06F 3/04817* (2013.01); *G06F 9/451* (2018.02)

(58) Field of Classification Search
CPC .... G06F 3/0484; G06F 3/04817; G06F 9/451; G06F 3/0486; G06F 3/0488;
(Continued)

(56) References Cited

U.S. PATENT DOCUMENTS 5,390,295 A * 2/1995 Bates .................... G06F 3/0481
714/E11.188
5,644,737 A * 7/1997 Tuniman ............... G06F 3/0481
715/810
(Continued)

FOREIGN PATENT DOCUMENTS

CA 2168762 C 2/1995
CN 1725163 A 1/2006
(Continued)

OTHER PUBLICATIONS

Supplementary Search Report for Chinese Application No. 201610916488.1 dated Jan. 8, 2020 (1 page).
(Continued)

*Primary Examiner* — Steven B Theriault (57) ABSTRACT

Methods, systems, and apparatus, including computer programs encoded on computer storage media, for application interface management are provided. One of the methods may include: obtaining interface layout parameters from an interface layout server. The interface layout parameters may include layout parameters of one or more functional areas and layout parameters of one or more functional icons. The method may also include generating an application interface according to the obtained layout parameters of functional areas and obtained layout parameters of functional icons; in response to a change operation by a user on the application interface, changing an interface layout of the application interface; and storing layout parameters of one or more functional areas and layout parameters of one or more functional icons corresponding to the changed application interface, to the interface layout server. Each functional area may include one or more functional icons.

20 Claims, 6 Drawing Sheets

Related U.S. Application Data continuation of application No. PCT/CN2017/105863, filed on Oct. 12, 2017.

(51) Int. Cl.
- *G06F 3/0481* (2013.01)
- *G06F 9/451* (2018.01)
- *G06F 3/0488* (2013.01)
- *G06F 3/0486* (2013.01)

(58) Field of Classification Search
CPC .. G06F 3/0482; G06F 3/04886; G06F 3/0481; G06F 3/04842; G06F 2203/04803; G06F 2203/04808; G06F 3/048
See application file for complete search history.

(56) References Cited

U.S. PATENT DOCUMENTS

| | | | | |
|---|---|---|---|---|
| 5,712,995 | A * | 1/1998 | Cohn | G06F 3/0481 715/792 |
| 5,760,772 | A * | 6/1998 | Austin | G06F 3/0481 715/798 |
| 5,801,703 | A | 9/1998 | Bowden et al. | |
| 5,917,492 | A | 6/1999 | Bereiter et al. | |
| 5,920,315 | A * | 7/1999 | Santos-Gomez | G06F 3/0481 715/792 |
| 5,986,657 | A * | 11/1999 | Berteig | G06F 3/0481 715/792 |
| 6,195,094 | B1 * | 2/2001 | Celebiler | G06F 3/0481 715/764 |
| 6,232,972 | B1 * | 5/2001 | Arcuri | G06F 9/453 715/815 |
| 6,603,493 | B1 * | 8/2003 | Lovell | G06F 9/451 715/800 |
| 6,665,083 | B1 | 12/2003 | Nakajima et al. | |
| 6,781,610 | B2 | 8/2004 | Os et al. | |
| 6,832,355 | B1 * | 12/2004 | Duperrouzel | G06F 16/9577 715/788 |
| 6,857,105 | B1 * | 2/2005 | Fox | G06F 3/0482 715/808 |
| 6,919,890 | B2 * | 7/2005 | Halstead, Jr. | G06T 11/60 345/440 |
| 6,950,993 | B2 | 9/2005 | Breinberg | |
| 7,013,431 | B2 * | 3/2006 | Taylor | G06F 3/0481 715/788 |
| 7,036,089 | B2 * | 4/2006 | Bauer | G06F 3/0481 715/789 |
| 7,340,690 | B2 | 3/2008 | Lau | |
| 7,395,500 | B2 | 7/2008 | Whittle et al. | |
| 7,480,872 | B1 * | 1/2009 | Ubillos | G06F 3/0483 715/716 |
| 7,512,898 | B2 | 3/2009 | Jennings et al. | |
| 7,870,508 | B1 | 1/2011 | Wright et al. | |
| 7,882,448 | B2 | 2/2011 | Haug | |
| 7,913,183 | B2 | 3/2011 | Czerwinski et al. | |
| 7,933,632 | B2 | 4/2011 | Flynt et al. | |
| 8,117,542 | B2 | 2/2012 | Radtke et al. | |
| 8,423,911 | B2 * | 4/2013 | Chaudhri | G06F 3/0486 715/835 |
| 8,495,504 | B2 | 7/2013 | Brugler et al. | |
| 8,533,631 | B2 | 9/2013 | Ha et al. | |
| 8,538,398 | B2 | 9/2013 | Wilson et al. | |
| 8,635,553 | B2 * | 1/2014 | Dhawan | G06F 3/0481 715/800 |
| 8,677,286 | B2 * | 3/2014 | Davis | H04M 1/72403 715/864 |
| 8,689,137 | B2 * | 4/2014 | McCormack | G06F 3/0481 715/810 |
| 8,692,736 | B1 | 4/2014 | Johnston et al. | |
| 8,707,212 | B2 | 4/2014 | Orgen | |
| 8,713,473 | B2 * | 4/2014 | Shah | G06F 9/451 715/790 |
| 8,739,038 | B2 | 5/2014 | McCormack et al. | |
| 8,739,068 | B2 | 5/2014 | Albertson | |
| 8,799,823 | B2 | 8/2014 | Kawashima et al. | |
| 8,977,963 | B1 * | 3/2015 | Joyce | G11B 27/34 715/716 |
| 9,001,046 | B2 | 4/2015 | Kim | |
| 9,021,393 | B2 | 4/2015 | Kim et al. | |
| 9,395,900 | B2 | 7/2016 | Bae | |
| 9,442,627 | B2 * | 9/2016 | Sarnoff | G06F 40/14 |
| 9,535,568 | B2 | 1/2017 | Hong et al. | |
| 9,542,072 | B2 | 1/2017 | Asai | |
| 9,557,887 | B2 * | 1/2017 | Muller | G06F 3/0482 |
| 9,563,327 | B1 * | 2/2017 | Pham | G06F 3/04847 |
| 9,690,450 | B2 | 6/2017 | Satterfiled et al. | |
| 9,794,359 | B1 * | 10/2017 | Lessin | H04L 67/22 |
| 9,798,453 | B2 | 10/2017 | Shaw et al. | |
| 9,841,980 | B2 | 12/2017 | Anderson et al. | |
| 9,870,122 | B2 | 1/2018 | Jin et al. | |
| 10,031,974 | B1 | 7/2018 | Abdullah et al. | |
| 10,209,858 | B2 * | 2/2019 | Yook | G06F 3/0486 |
| 10,229,201 | B2 * | 3/2019 | Chakra | G06F 16/951 |
| 10,331,287 | B2 | 6/2019 | Fard et al. | |
| 10,331,329 | B2 | 6/2019 | Cha et al. | |
| 10,331,335 | B2 | 6/2019 | Roth et al. | |
| 10,386,994 | B2 | 8/2019 | Singal et al. | |
| 10,564,792 | B2 * | 2/2020 | Kim | G06F 3/0481 |
| 2001/0035882 | A1 | 11/2001 | Stoakley et al. | |
| 2002/0054052 | A1 * | 5/2002 | Sharma | G06F 16/9577 715/700 |
| 2002/0160817 | A1 | 10/2002 | Salmimaa et al. | |
| 2002/0191028 | A1 * | 12/2002 | Senechalle | G09G 5/14 715/800 |
| 2002/0196286 | A1 * | 12/2002 | Taylor | G09G 5/14 715/788 |
| 2003/0040974 | A1 | 2/2003 | Chauvin et al. | |
| 2003/0063125 | A1 * | 4/2003 | Miyajima | G06F 3/0481 715/781 |
| 2003/0222923 | A1 | 12/2003 | Li | |
| 2004/0008224 | A1 * | 1/2004 | Molander | G06F 3/0481 715/764 |
| 2004/0119745 | A1 | 6/2004 | Bartek et al. | |
| 2004/0212640 | A1 | 10/2004 | Mann et al. | |
| 2005/0039137 | A1 | 2/2005 | Bellwood et al. | |
| 2005/0060665 | A1 * | 3/2005 | Rekimoto | G06F 9/451 715/810 |
| 2005/0090288 | A1 | 4/2005 | Stohr et al. | |
| 2005/0131992 | A1 * | 6/2005 | Goldstein | G06F 16/95 709/202 |
| 2005/0235220 | A1 * | 10/2005 | Duperrouzel | G06F 16/957 715/788 |
| 2006/0020900 | A1 | 1/2006 | Kumagai et al. | |
| 2006/0028659 | A1 | 2/2006 | Nishikawa | |
| 2006/0036964 | A1 | 2/2006 | Satterfield et al. | |
| 2006/0123359 | A1 | 6/2006 | Schatzberger | |
| 2006/0224989 | A1 | 10/2006 | Pettiross et al. | |
| 2006/0242557 | A1 | 10/2006 | Nortis, III | |
| 2007/0055936 | A1 * | 3/2007 | Dhanjal | G06F 9/451 715/700 |
| 2007/0055943 | A1 | 3/2007 | Mccormack et al. | |
| 2007/0130532 | A1 | 6/2007 | Fuller et al. | |
| 2007/0157089 | A1 | 7/2007 | Van Os et al. | |
| 2007/0192726 | A1 * | 8/2007 | Kim | G09G 5/14 715/781 |
| 2007/0201048 | A1 | 8/2007 | DuBois | |
| 2007/0291018 | A1 | 12/2007 | Park et al. | |
| 2008/0109327 | A1 * | 5/2008 | Mayle | G06Q 30/0603 705/27.1 |
| 2008/0209533 | A1 | 8/2008 | Abrams et al. | |
| 2008/0276198 | A1 * | 11/2008 | Fertl | G06F 3/0481 715/841 |
| 2009/0178008 | A1 | 7/2009 | Herz et al. | |
| 2009/0271735 | A1 | 10/2009 | Anderson et al. | |
| 2009/0315867 | A1 * | 12/2009 | Sakamoto | G06F 3/03547 345/184 |
| 2010/0083181 | A1 | 4/2010 | Matsushima et al. | |
| 2010/0088634 | A1 * | 4/2010 | Tsuruta | G09G 5/14 715/800 |
| 2010/0199173 | A1 | 8/2010 | Morooka | |
| 2010/0248788 | A1 | 9/2010 | Yook et al. | |

(56) References Cited

U.S. PATENT DOCUMENTS

| | | | |
|---|---|---|---|
| 2010/0283743 A1 | 11/2010 | Coddington | |
| 2011/0010672 A1* | 1/2011 | Hope | G06F 3/0486 |
| | | | 715/841 |
| 2011/0061010 A1* | 3/2011 | Wasko | G06F 3/0482 |
| | | | 715/769 |
| 2011/0072373 A1* | 3/2011 | Yuki | H04N 21/485 |
| | | | 715/764 |
| 2011/0107267 A1 | 5/2011 | Ha et al. | |
| 2011/0119627 A1 | 5/2011 | Cho et al. | |
| 2011/0128575 A1 | 6/2011 | Iwata | |
| 2011/0205178 A1 | 8/2011 | Yoshida et al. | |
| 2011/0208598 A1 | 8/2011 | Sato et al. | |
| 2011/0219321 A1 | 9/2011 | Gonzalez Veron et al. | |
| 2012/0042272 A1* | 2/2012 | Hong | G06F 3/04883 |
| | | | 715/770 |
| 2012/0162266 A1 | 6/2012 | Douglas et al. | |
| 2012/0208593 A1* | 8/2012 | Yang | G06F 3/0481 |
| | | | 455/556.1 |
| 2012/0260217 A1 | 10/2012 | Celebisoy | |
| 2012/0290979 A1* | 11/2012 | Devecka | G06Q 30/0273 |
| | | | 715/810 |
| 2012/0304042 A1 | 11/2012 | Pereira et al. | |
| 2012/0317520 A1 | 12/2012 | Lee | |
| 2013/0055055 A1 | 2/2013 | Turcotte et al. | |
| 2013/0055124 A1 | 2/2013 | Wang | |
| 2013/0057587 A1 | 3/2013 | Leonard et al. | |
| 2013/0125050 A1* | 5/2013 | Goshey | G06F 3/048 |
| | | | 715/800 |
| 2013/0125056 A1* | 5/2013 | Suda | G06F 3/0482 |
| | | | 715/846 |
| 2013/0132874 A1 | 5/2013 | He et al. | |
| 2013/0166381 A1 | 6/2013 | Umeda | |
| 2013/0174084 A1* | 7/2013 | Lord | G16H 50/20 |
| | | | 715/781 |
| 2013/0227469 A1 | 8/2013 | Park | |
| 2013/0268895 A1* | 10/2013 | Yamaki | G06F 3/04817 |
| | | | 715/835 |
| 2013/0305187 A1 | 11/2013 | Phillips et al. | |
| 2014/0015786 A1* | 1/2014 | Honda | G06F 3/04886 |
| | | | 345/173 |
| 2014/0092426 A1 | 4/2014 | Fujishita et al. | |
| 2014/0101581 A1 | 4/2014 | Lan et al. | |
| 2014/0165006 A1* | 6/2014 | Chaudhri | G06F 3/0487 |
| | | | 715/835 |
| 2014/0172569 A1 | 6/2014 | Banda et al. | |
| 2014/0201662 A1 | 7/2014 | Liu | |
| 2014/0203999 A1 | 7/2014 | Shim | |
| 2014/0229894 A1* | 8/2014 | Vinna | G06F 16/639 |
| | | | 715/810 |
| 2014/0245234 A1 | 8/2014 | Lee et al. | |
| 2014/0258901 A1* | 9/2014 | Cho | G06F 3/03545 |
| | | | 715/765 |
| 2014/0359419 A1* | 12/2014 | Kang | G06F 40/177 |
| | | | 715/227 |
| 2015/0033164 A1 | 1/2015 | Jung et al. | |
| 2015/0058762 A1* | 2/2015 | Sato | G06F 3/04845 |
| | | | 715/763 |
| 2015/0067596 A1* | 3/2015 | Brown | G06F 3/04847 |
| | | | 715/808 |
| 2015/0089355 A1 | 3/2015 | Peng et al. | |
| 2015/0106731 A1* | 4/2015 | Matas | H04L 51/32 |
| | | | 715/744 |
| 2015/0149894 A1 | 5/2015 | Zhang | |
| 2015/0277682 A1 | 10/2015 | Kaufthal et al. | |
| 2015/0277708 A1 | 10/2015 | Rodrig et al. | |
| 2015/0346976 A1* | 12/2015 | Karunamuni | G06F 3/04847 |
| | | | 715/765 |
| 2015/0363049 A1 | 12/2015 | Sadouski et al. | |
| 2015/0363055 A1* | 12/2015 | Katsumata | G06F 3/147 |
| | | | 715/830 |
| 2016/0044191 A1* | 2/2016 | Okada | H04N 1/00413 |
| | | | 358/1.13 |
| 2016/0202852 A1* | 7/2016 | Park | G06F 3/04886 |
| | | | 715/781 |
| 2016/0210030 A1* | 7/2016 | Kollencheri Puthenveettil | G06F 3/04883 |
| 2016/0216929 A1 | 7/2016 | Hua | |
| 2016/0259499 A1 | 9/2016 | Kocienda et al. | |
| 2016/0291843 A1* | 10/2016 | Sheng | G06F 9/48 |
| 2017/0041455 A1* | 2/2017 | Hong | G06F 3/04842 |
| 2017/0255342 A1* | 9/2017 | Fontaine | G06T 11/60 |
| 2018/0357080 A1 | 12/2018 | Kown | |

FOREIGN PATENT DOCUMENTS

| | | |
|---|---|---|
| CN | 102566928 A | 7/2012 |
| CN | 103415835 A | 11/2013 |
| CN | 101833418 B | 12/2014 |
| CN | 104360798 A | 2/2015 |
| CN | 104536667 A | 4/2015 |
| CN | 105094521 A | 11/2015 |
| CN | 105183345 A | 12/2015 |
| CN | 105204873 A | 12/2015 |
| CN | 103106016 B | 3/2016 |
| CN | 105843613 A | 8/2016 |
| CN | 105867754 A | 8/2016 |
| CN | 107015721 A | 8/2017 |
| EP | 2518617 A1 | 10/2012 |
| EP | 2770424 A2 | 8/2014 |
| EP | 2682582 B1 | 12/2017 |
| JP | H7-244568 A | 9/1995 |
| JP | 2010-204964 A | 9/2010 |
| JP | 2011-113392 A | 6/2011 |
| JP | 2016-508631 A | 3/2016 |
| JP | 2016-511471 A | 4/2016 |
| KR | 100706057 B1 | 4/2007 |
| KR | 100789465 B1 | 1/2008 |
| KR | 10-2013-0099720 A | 9/2013 |
| KR | 10-2014-0094082 A | 7/2014 |
| KR | 101627861 B1 | 6/2016 |
| KR | 101962979 B1 | 3/2019 |
| WO | 01/079977 A1 | 10/2001 |
| WO | 2013/169877 A3 | 11/2013 |

OTHER PUBLICATIONS

Second Office Action for Chinese Application No. 201610916488.1 dated Jan. 15, 2020 (14 pages).

Written Opinion for Singaporean Application No. 11201903464Y dated May 5, 2020.

Search Report for European Application No. 17862933.3 dated May 20, 2020.

Office Action for Japanese Application No. 2019-521146 dated Jun. 30, 2020.

Office Action for Korean Application No. 10-2019-7014021 dated Oct. 27, 2020.

Office Action for Taiwanese Application No. 106131558 dated Nov. 27, 2018, 6 pages.

Office Action for Taiwanese Application No. 106131558 dated Mar. 19, 2019, 6 pages.

First Search for Chinese Application No. 201610916488.1 dated May 21, 2019, 1 page.

First Office Action for Chinese Application No. 201610916488.1 dated May 29, 2019 with English machine translation, 12 pages.

Written Opinion of the International Search Authority and International Search Report for PCT Application No. PCT/CN2017/105863 dated Dec. 19, 2017, 13 pages.

International Preliminary Report on Patentability for PCT/CN2017/105863 dated Apr. 23, 2019, 9 pages.

Apurav Chauhan, "Weex vs React Native from scratch—2018," https://codeburst.io/weex-vs-react-native-from-scratch-2018-32ae41d1effic, retrieved from internet on Jul. 3, 2019 (15 pages).

Office Action for Japanese Application No. 2019-521146 dated Mar. 23, 2021.

Office Action for Korean Application No. 10-2019-7014021 dated Apr. 8, 2021.

(56) References Cited

OTHER PUBLICATIONS

First Examination Report for Indian Application No. 201947015797 dated Jun. 9, 2021.

* cited by examiner

FIG. 9

APPLICATION INTERFACE MANAGEMENT METHOD AND APPARATUS

CROSS-REFERENCE TO RELATED APPLICATIONS

The present application is a continuation application of U.S. patent application Ser. No. 16/389,105, filed Apr. 19, 2019, which is a continuation application of International Application No. PCT/CN2017/105863, filed on Oct. 12, 2017, which claims priority to and benefits of the Chinese Patent Application No. 201610916488.1 filed with the State Intellectual Property Office (SIPO) of the People's Republic China on Oct. 20, 2016. The entire contents of all of the above-identified applications are incorporated herein by reference.

TECHNICAL FIELD

The present application relates to the technical field of terminals, particularly to an application interface management method and apparatus.

BACKGROUND

An APP (Application) is a kind of software that can be installed in smart terminal devices, such as mobile phones and tablet computers. Users may perform various functions through related APPS, such as: payment, shopping, and financial management. In related art, the layout of an APP interface typically is set by a developer in advance. However, as different users have different usage requirements for an APP, an application interface set in advance usually is unable to meet the usage requirements of all users.

SUMMARY

In light of the above, the present specification provides an application interface management method and apparatus.

In one aspect, the present specification provides an application interface management method. The method may include: obtaining interface layout parameters from an interface layout server. The interface layout parameters may include layout parameters of one or more functional areas and layout parameters of one or more functional icons. The method may also include generating an application interface according to the obtained layout parameters of functional areas and obtained layout parameters of functional icons; in response to a change operation by a user on the application interface, changing an interface layout of the application interface; and storing layout parameters of one or more functional areas and layout parameters of one or more functional icons corresponding to the changed application interface, to the interface layout server. Each functional area may include one or more functional icons.

In another aspect, the present specification provides an application interface management apparatus. The apparatus may include a parameter requesting unit, an interface generating unit, an interface changing unit, and a parameter storing unit. The parameter requesting unit may be configured to request interface layout parameters from an interface layout server in an application start process. The interface layout parameters may include layout parameters of one or more functional areas and layout parameters of one or more functional icons. The interface generating unit may be configured to generate an application interface according to obtained layout parameters of functional areas and obtained layout parameters of functional icons. Each functional area may include one or more functional icons. The interface changing unit may be configured to, in response to a change operation by a user on the application interface, change an interface layout of the application interface. The parameter storing unit may be configured to store layout parameters of one or more functional areas and layout parameters of one or more functional icons corresponding to the changed application interface, to the interface layout server.

In a further aspect, the present specification provides a non-transitory computer-readable storage medium for application interface management. The storage medium may store instructions executable by one or more processors to cause the one or more processors to perform operations. The operations may include: obtaining interface layout parameters from an interface layout server. The interface layout parameters may include layout parameters of one or more functional areas and layout parameters of one or more functional icons. The operations may also include generating an application interface according to the obtained layout parameters of functional areas and obtained layout parameters of functional icons; in response to a change operation by a user on the application interface, changing an interface layout of the application interface; and storing layout parameters of one or more functional areas and layout parameters of one or more functional icons corresponding to the changed application interface, to the interface layout server. Each functional area may include one or more functional icons.

In yet another aspect, the present specification provides an application interface management system. The system may include one or more processors and one or more non-transitory computer-readable memories coupled to the one or more processors and configured with instructions executable by the one or more processors to cause the system to perform operations. The operations may include: obtaining interface layout parameters from an interface layout server. The interface layout parameters may include layout parameters of one or more functional areas and layout parameters of one or more functional icons. The operations may also include generating an application interface according to the obtained layout parameters of functional areas and obtained layout parameters of functional icons; in response to a change operation by a user on the application interface, changing an interface layout of the application interface; and storing layout parameters of one or more functional areas and layout parameters of one or more functional icons corresponding to the changed application interface, to the interface layout server. Each functional area may include one or more functional icons.

As shown in the above description, the present specification sets an interface management solution based on actual user requirements, and the user can customize the layout of an entire application interface according to their own requirements, thereby improving user experience and user stickiness.

BRIEF DESCRIPTION OF THE DRAWINGS

By reading the following detailed description of some implementation manners, a variety of other advantages and benefits will become clear to persons having ordinary skills in the art. The drawings are merely illustrative, and are not to be taken as limiting.

DETAILED DESCRIPTION

Exemplary embodiments will be described in detail, with examples shown in the accompanying drawings. When the description below involves the accompanying drawings, unless otherwise indicated, the same numeral in different accompanying drawings stands for the same or similar element. The implementation manners described in the following exemplary embodiments do not represent all the implementation manners consistent with the present application. Conversely, they are only examples of the apparatus and method described in detail in the attached claims and consistent with some aspects of the present application.

The terms used in the present application are only for the purpose of describing exemplary embodiments and not intended to limit the present application. The singular forms "one", "the", and "this" used in the present application and in the attached claims also are intended to cover plural forms unless their meanings are otherwise clearly indicated in the context. It should also be understood that the term "and/or" used in the text refers to any or all possible combinations containing one or more of the associated listed items.

It should be understood that although the present application may use terms such as first, second, and third to describe various kinds of information, the information should not be limited to these terms. These terms are only intended to differentiate information of the same type. For example, without departing from the scope of the present application, first information may also be referred to as second information, and similarly, second information may also be referred to as first information. Subject to the context, the term "if" used here may be interpreted as "at the time of . . . ", "when . . . ", or "in response to a determination."

In related art, an application interface generally includes a plurality of page areas, and each page area may include one or more buttons in a form of icons. Please refer to the schematic diagram of an application interface shown in FIG. 1. The area where "Button A", "Button B", and "Button C" are located is a page area of the application interface. "Button A", "Button B", and "Button C" are icon buttons in this area, and by clicking on these icon buttons, corresponding functions may be enabled, such as: displaying a payment code, displaying an existing coupon, and the like. The area where "Button D", "Button E", . . . , "Button H" are located is another page area of the application interface. "Button D", "Button E", . . . , "Button H" are icon buttons in this area, and by clicking on these icon buttons, corresponding functions may also be enabled, such as: enabling an account transfer function, enabling a payment function, and the like.

Figure 1:
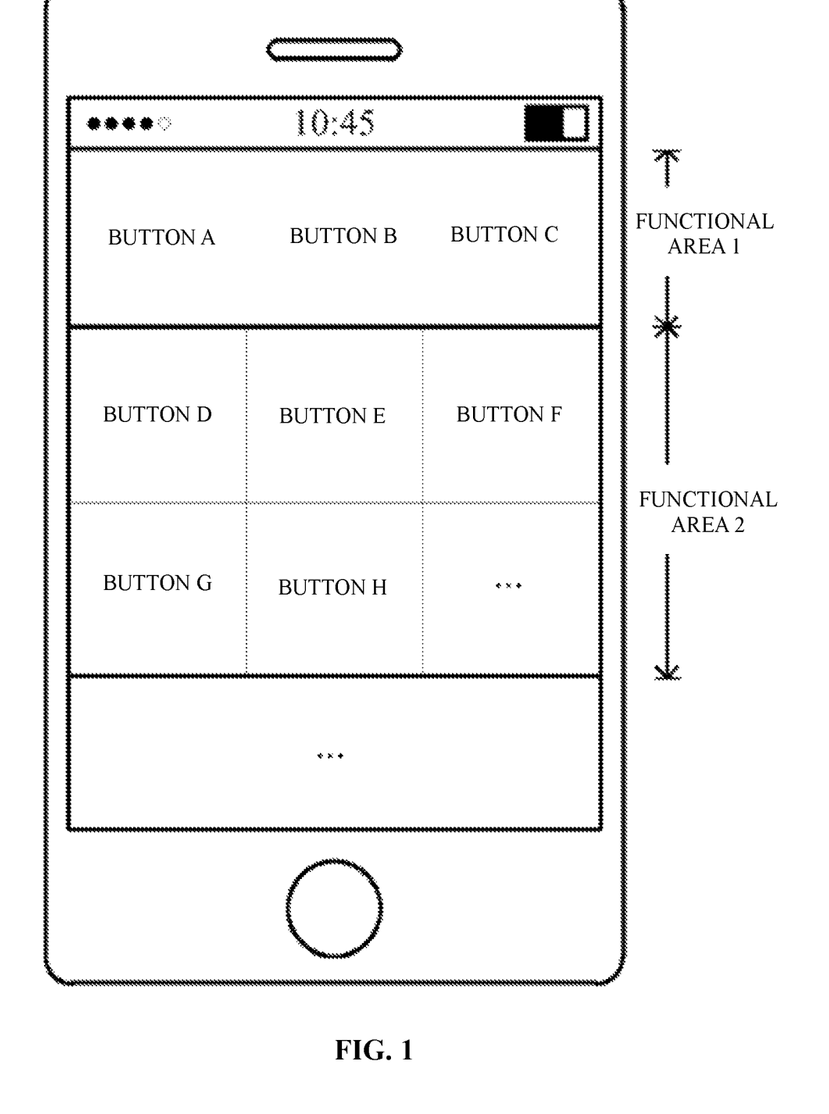
FIG. 1 is a schematic diagram of an application interface shown in an exemplary embodiment of the present specification.

In the present specification, to facilitate description, these buttons that are used to enable corresponding functions/operations may be called functional icons, and the page areas may be called functional areas. The foregoing functional areas and functional icons are generally set by developers. In general, the developers often set functional icons of the same function type in the same functional area according to service providers requirements. For example, "Button A", "Button B" and "Button C" shown in FIG. 1 are located in functional area 1, and "Button D", "Button E", . . . , "Button H" are located in functional area 2. Some applications allow users to customize the functional icons in a certain functional area. For example, a user may set an order of "Button D", "Button E", . . . , "Button H" in functional area 2 according to his own usage preferences. However, this only allows a personalized setting in a certain functional area, settings in other areas are still limited, and thus, the actual needs of all users are not met.

Figure 2:
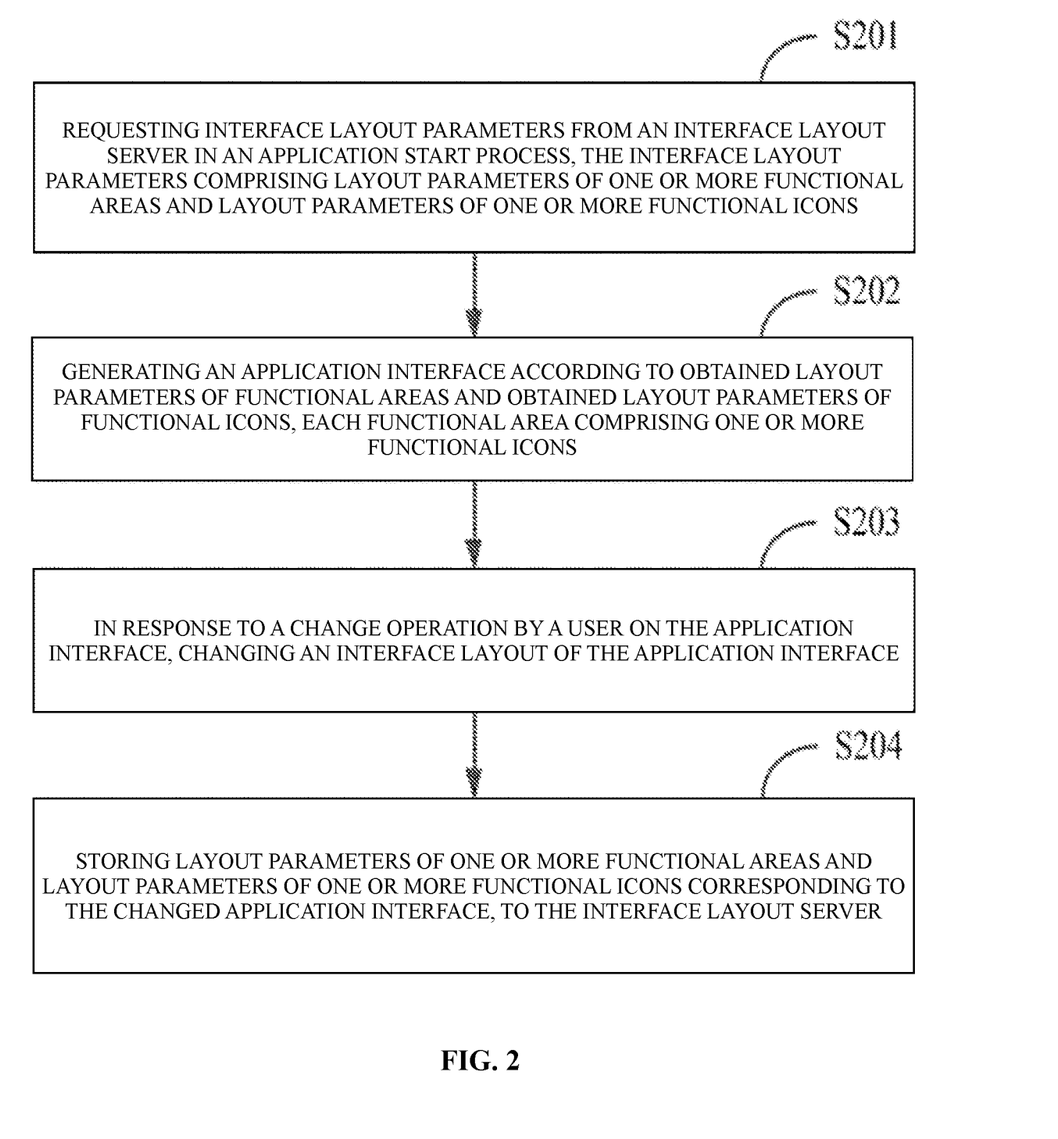
FIG. 2 is a flow chart of an application interface management method shown in an exemplary embodiment of the present specification.

FIG. 2 is a flow chart of an application interface management method shown in an exemplary embodiment of the present specification.

The application interface management method may be used in smart terminal devices, such as mobile phones and tablet computers. The method may include the following steps.

In Step 201, interface layout parameters may be requested from an interface layout server in an application start process. The interface layout parameters may include layout parameters of one or more functional areas and layout parameters of one or more functional icons.

In this embodiment, after a user starts an application, the application may request the interface layout parameters of this application from an interface layout server. The interface layout server may be a server or a server cluster deployed by a service provider, and it may be used to store interface layout parameters of an interface personalized by a user. The interface layout server may further be used to provide related business services for users.

In some embodiments, the interface layout parameters may include: layout parameters of one or more functional areas in each interface of this application, and layout parameters of one or more functional icons. The layout parameters of the functional areas may generally include: IDs of functional areas and location parameters of the functional areas in the interface. The layout parameters of the functional icons usually include: IDs of functional icons, IDs of functional areas where the functional icons are located, and location parameters of the functional icons in their functional areas (where the functional icons are located).

Still referring to the application interface shown in FIG. 1 as an example, the interface layout parameters obtained by the application may include: the ID of functional area 1 and the location parameter of functional area 1 in this interface, the ID of functional area 2 and the location parameter of functional area 2 in this interface, the IDs of functional icon A to functional icon H, the corresponding functional area IDs where functional icon A to functional icon H are located, and the location parameters in the functional areas where each functional icon is located. For example, the ID of functional area 1 is ID1, and the location parameter of functional area 1 is 1, indicating that the location of functional area 1 is the uppermost part of this interface; the ID of functional area 2 is ID2, and the location parameter of functional area 2 is 2, indicating that the location of functional area 2 is below functional area 1 and is adjacent to functional area 1.

In Step 202, an application interface is generated according to the obtained layout parameters of functional areas and the obtained layout parameters of functional icons. Each functional area may include one or more functional icons.

Based on Step 201, after the interface layout parameters are obtained, an application interface may be generated according to the interface layout parameters.

In one embodiment, a corresponding functional area may be displayed in an application interface according to the ID of the functional area and the location parameter of the functional area in the interface. Corresponding functional icons may be obtained from a locally prestored functional icon database according to the IDs of the functional icons, and they may be displayed in the corresponding functional areas according to the IDs of their functional areas and the location parameters of the functional icons in their functional areas. The functional icon database usually is obtained from an interface layout server and stored locally when a user installs or upgrades the application. Subsequently, when displaying the interface, the corresponding application icons may be directly obtained from the functional icon database according to the IDs of the functional icons, without making a request to the server again, thereby speeding up the interface display and saving user data traffic.

Still referring to the application interface shown in FIG. 1 as an example, in this step, functional area 1 may be displayed in the uppermost part of the application interface according to functional area ID1, and functional area 2 may be displayed adjacent to and under functional area 1 in the application interface according to functional area ID2. Assuming the background color of functional area 1 is light blue and the background color of functional area 2 is white, a light blue functional area 1 and a white functional area 2 may be displayed. Further, functional icon A to functional icon H may be obtained from a locally prestored functional icon database according to the IDs of functional icon A to functional icon H, and then functional icon A is displayed in light blue functional area 1 according to functional area ID1 to which functional icon A belongs and the location parameter of functional icon A in functional area 1. Functional icon B to functional icon H may be displayed in the same way.

The foregoing interface display process is not visible to users. After a user starts an application, the user may see the displayed application interface, whereas the foregoing steps 201 and 202 describe the process of the application arranging the interface in backend.

In Step 203, in response to a change operation by a user on the application interface, the interface layout of the application interface may be changed.

In some embodiments, a user may customize the layout of an application interface. For example, the user may adjust the locations of every functional icon and every functional area and may also delete functional icons and functional areas the user does not use. The user may trigger a change in an interface layout through a specific operation. The user may also press and hold or double click on any functional icon to trigger a change in an interface layout.

Figure 3:
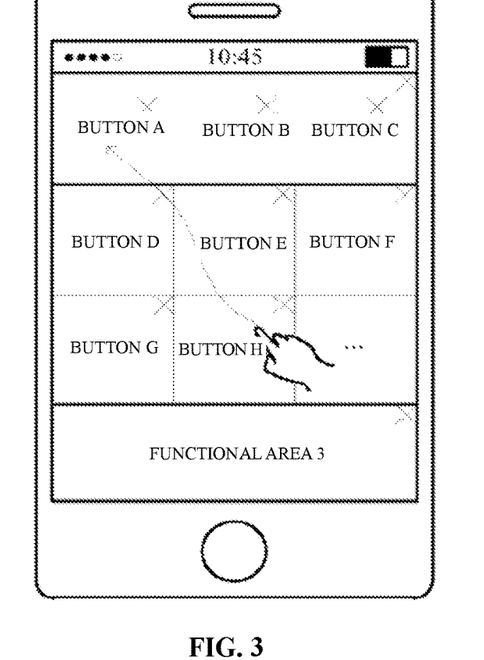
FIG. 3 is a schematic diagram of an alternative application interface shown in an exemplary embodiment of the present specification.
Figure 4:
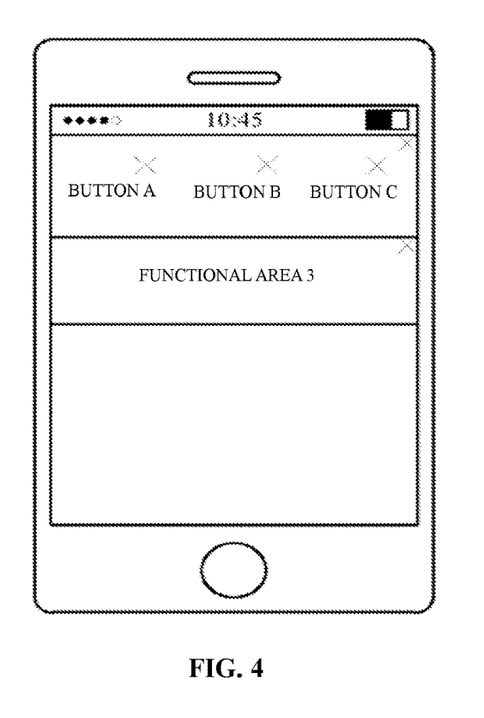
FIG. 4 is a schematic diagram of an alternative application interface shown in an exemplary embodiment of the present specification.

In one embodiment, when a user triggers a change in an interface layout, a close button of a shape "x" may be displayed in the upper right corner of each functional area and each functional icon. When the user clicks on the "x" button of a functional area or a functional icon, the user may delete the corresponding functional area or functional icon in the current application interface. When a user deletes a functional area, all functional icons in the functional area may be deleted all together, and the displayed layout of the application interface is changed by moving adjacent functional areas closer together. Based on the application interface shown in FIG. 1, the application interface shown in FIG. 3 may further include functional area 3. Assuming functional area 3 is a functional area for displaying advertisements and does not include any functional icons, when a user clicks on the "x" button in the upper right corner of functional area 3, functional area 3 may be deleted from the application interface, resulting in the application interface shown in FIG. 1. Instead, assuming the user has deleted all functional icons in functional area 2, functional area 3 will be automatically adjusted to the location of the former functional area 2, forming the application interface shown in FIG. 4.

In this embodiment, a user may further adjust the locations of functional areas or functional icons. In the application interface shown in FIG. 3, after pressing and holding functional icon F, the user may drag functional icon F to the location where functional icon A is located to achieve a cross-area location adjustment of functional icons and form the application interface shown in FIG. 5. In another example, the user may press and hold functional area 3 and drag it to the location of functional area 2 to switch the locations of functional area 3 and functional area 2 and form the application interface shown in FIG. 6.

Figure 5:
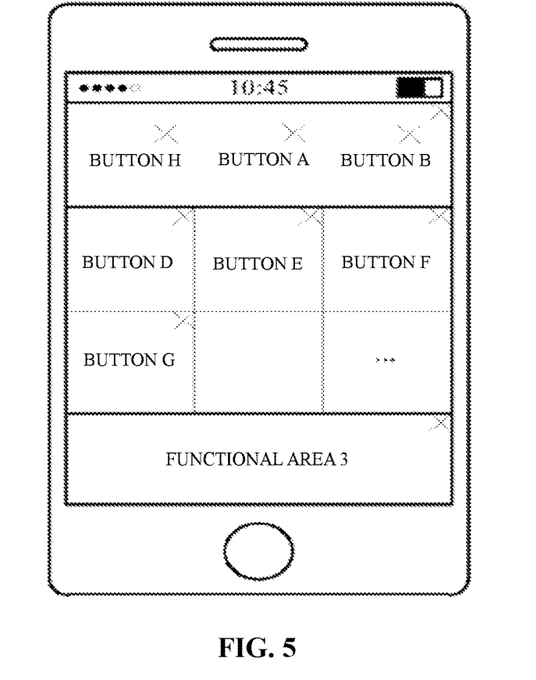
FIG. 5 is a schematic diagram of an alternative application interface shown in an exemplary embodiment of the present specification.
Figure 6:
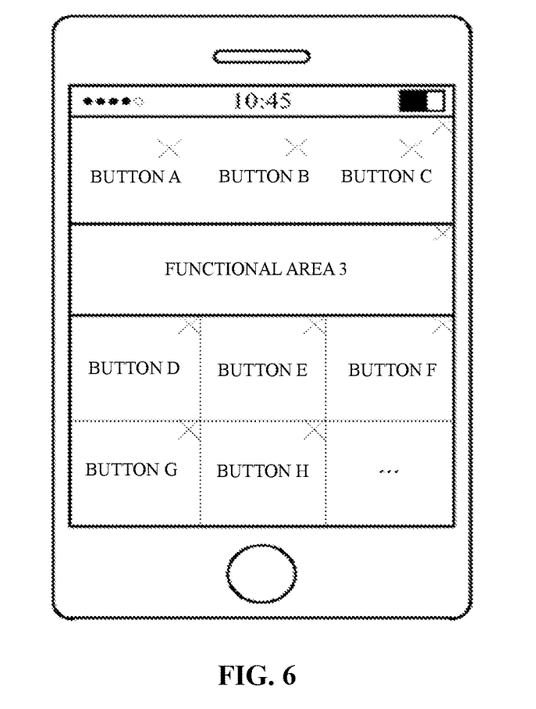
FIG. 6 is a schematic diagram of an alternative application interface shown in an exemplary embodiment of the present specification.

In one example, the dimensions of the functional areas may be fixed. As shown in FIG. 1 and FIG. 5, the dimensions of functional area 1 are fixed. When a user moves functional icon H to the location of functional icon A, the locations of functional icon A and functional icon B are moved accordingly to make room for functional icon H. As the dimensions of functional area 1 are not changeable, there may be not enough room for functional icon C, and consequently, functional icon C may be deleted.

Figure 7:
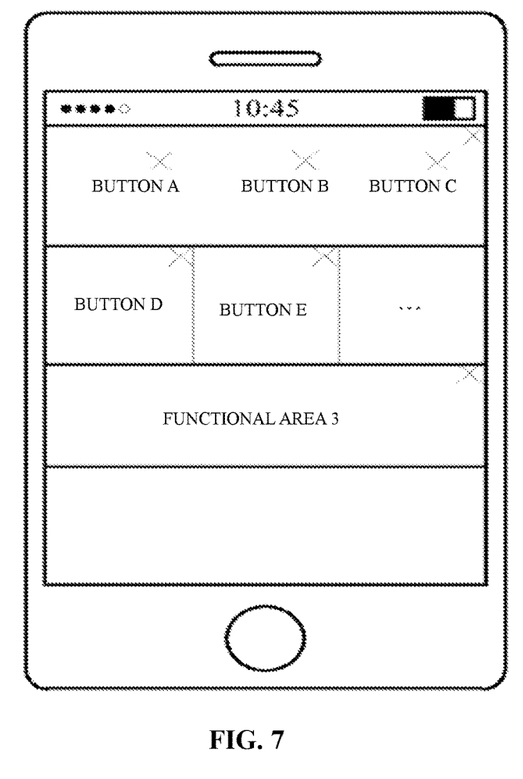
FIG. 7 is a schematic diagram of an alternative application interface shown in an exemplary embodiment of the present specification.

In another example, the dimensions of the functional areas may be scalable. Based on the application interface shown in FIG. 3, assuming the user has deleted functional icon F to functional icon H in functional area 2, the dimensions of functional area 2 will decrease accordingly, and functional area 3 will be moved upwards accordingly, forming the application interface shown in FIG. 7.

In Step 204, layout parameters of one or more functional areas and layout parameters of one or more functional icons corresponding to the changed application interface may be stored, to the interface layout server.

Based on the foregoing step 203, when a user exits from an interface change, the application may store to the interface layout server the layout parameters of one or more functional areas and the layout parameters of one or more functional icons corresponding to the current application interface. Here, the interface layout server may store interface layout parameters of the user according to a user account number.

As can be seen from the above description, the present specification sets an interface management solution based on actual user requirements, and users can customize the layout of an entire application interface according to their own requirements, thereby improving user experience and user stickiness.

Optionally, in another example, behavioral analysis of a user may be conducted based on the interface layout parameters, so as to perform targeted information push to the user. For instance, assuming user Xiao Bai arranges a fund icon in the most prominent and convenient location in an application interface, it may imply that Xiao Bai frequently buys and sells funds, so that fund-related information and advertisements may be pushed to Xiao Bai. The analysis and information push can be performed by the interface layout server or other servers.

Corresponding to the embodiments of the foregoing application interface management method, the present application further provides an embodiment of an application interface management apparatus.

Figure 8:
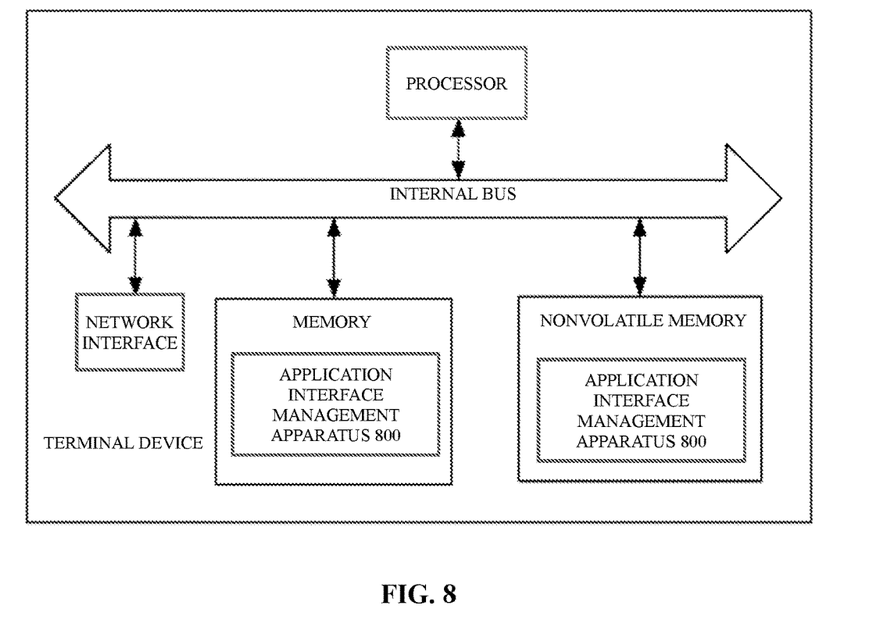
FIG. 8 is a structure diagram of a management apparatus used in an application interface shown in an exemplary embodiment of the present specification.

The embodiments of the application interface management apparatus provided by the present specification may be used on a terminal device. The apparatus may be implemented through software, hardware, or a combination of hardware and software. Taking implementation through software as an example, an apparatus is formed with the processor of the terminal device, which reads the corresponding computer program commands to memory and runs them. In terms of hardware, FIG. 8 is a hardware structure diagram of the terminal device where the application interface management apparatus provided by the present specification is located. In addition to a processor, memory, network interface, and NVM (nonvolatile memory) as shown in FIG. 8, the terminal device where the apparatus of the embodiment is located generally may further include other hardware according to the actual functions of the terminal device. They are not described in detail here.

Figure 9:
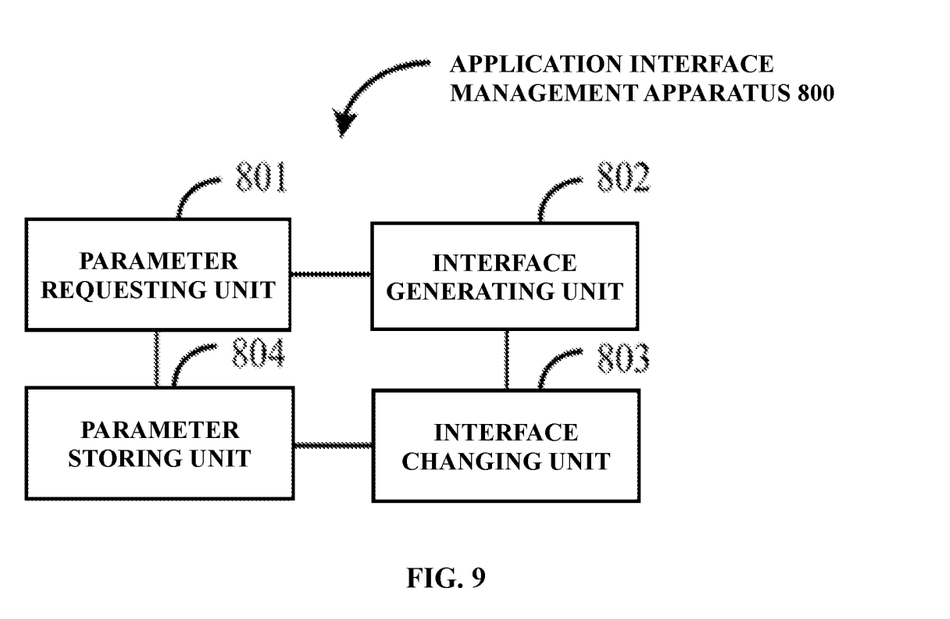
FIG. 9 is a block diagram of an application interface management apparatus shown in an exemplary embodiment of the present specification.

In FIG. 9, the management apparatus 800 of the application interface may be used in the terminal device shown in FIG. 8, and include: a parameter requesting unit 801, an interface generating unit 802, an interface changing unit 803, and a parameter storing unit 804.

Here, the parameter requesting unit is configured to request interface layout parameters from an interface layout server in an application start process. The interface layout parameters may include layout parameters of one or more functional areas and layout parameters of one or more functional icons.

The interface generating unit 802 is configured to generate an application interface according to obtained layout parameters of functional areas and obtained layout parameters of functional icons. Each functional area may include one or more functional icons.

The interface changing unit 803 is configured to change the interface layout of the current interface in response to a change operation by a user on the current application interface.

The parameter storing unit 804 is configured to store layout parameters of one or more functional areas and layout parameters of one or more functional icons corresponding to the changed application interface, to the interface layout server.

Optionally, layout parameters of the functional areas may include: IDs of functional areas and location parameters of functional areas in the interface.

Layout parameters of the functional icons may include: IDs of functional icons, IDs of functional areas where the functional icons are located, and location parameters of the functional icons in their functional areas.

The interface generating unit 802 may display corresponding functional areas in an application interface according to the IDs of the functional areas and the location parameters of the functional areas in the interface, obtain corresponding functional icons from a locally prestored functional icon database according to IDs of functional icons, and display the functional icons in a corresponding functional areas according to the IDs of their functional areas and the location parameters of the functional icons in their functional areas.

Optionally, the change operation may include: a functional icon deletion operation.

When all functional icons in a functional area are deleted, the interface changing unit 803 will delete the functional area and change the display layout of the application interface by moving adjacent functional areas closer together.

Optionally, dimensions of the functional areas are fixed or scalable.

Optionally, the interface layout parameters can be a basis of user behavior analysis and information push.

The implementation processes of the functions and effects of every unit in the foregoing apparatus are detailed in the implementation processes of corresponding steps in the foregoing method, and will not be repeated herein.

The apparatus embodiments essentially correspond to the method embodiments, so for relevant parts of the apparatus embodiments, please refer to the corresponding parts of the method embodiments. The apparatus embodiments described above are exemplary only, its units described as separate components may or may not be physically separate, and the components displayed as units may or may not be physical units, i.e., they may be located in the same place or distributed on a plurality of network units. Some or all of the modules may be selected according to the actual need to achieve the objectives of the solution of the present application. Those of ordinary skill in the art can understand and implement it without creative effort.

This application is described by referencing flow diagrams and/or block diagrams based on the application interface management method, apparatus, system, and computer program product of this embodiment. It should be understood that computer program instructions can be used to achieve every flow and/or block in the flow diagrams and/or block diagrams, as well as combinations of flows and/or blocks in the flow diagrams and/or block diagrams. These computer program instructions can be provided to the processor of a general-purpose computer, special-purpose computer, embedded processing machine, or other programmable data processing device to produce a machine, causing the instructions executed by the processor of a computer or other programmable data processing device to produce a device used to achieve the specified functions of one or more flows in a flow diagram and/or one or more blocks in a block diagram.

These computer program instructions can also be stored in computer-readable memory that can cause a computer or other programmable data processing device to operate in a given mode, causing the instructions stored in this computer-readable memory to generate a product comprising an instruction apparatus. This instruction apparatus achieves the functions specified in one or more flows of a flow chart and/or one or more blocks of a block diagram.

These computer program instructions can also be loaded onto a computer or other programmable data processing device, enabling the execution of a series of operation steps on the computer or other programmable device to produce computer processing. Thus, the instructions executed on the computer or other programmable device provide steps for achieving the specified functions of one or more flows in a flow chart and/or one or more blocks in a block diagram.

The memory could comprise the forms of volatile memory on computer-readable media, random access memory (RAM), and/or non-volatile RAM, such as read-only memory (ROM) or flash RAM. Memory is an example of computer-readable media.

Computer-readable media include permanent, nonpermanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, computer-readable media exclude transitory computer-readable media (transitory media), such as modulated data signals and carriers.

The foregoing descriptions are preferred embodiments of the present application and are not intended to limit the present application. All modifications, identical replacements, and improvements made without departing from the spirit and principle of the present application shall fall within the scope of the present application.

The invention claimed is:

1. A method, comprising:
    generating an application interface for a mobile terminal according to layout parameters of multiple functional areas and layout parameters of multiple functional icons, the multiple functional areas comprising a first functional area and a second functional area each including one or more of the multiple functional icons, wherein the multiple functional areas are distinguishable from each other by background colors;
    responsive to a user selecting a button on a target functional icon in the first functional area to delete the target functional icon, and without further user intervention:
        automatically changing one or more location parameters of the first functional area to decrease dimensions of the first functional area by scaling the first functional area such that the first functional area does not occupy a region in the application interface that was occupied by the first functional area prior to the scaling, and
        following the scaling of the first functional area, automatically changing one or more location parameters of the second functional area to move the second functional area such that the second functional area occupies at least part of the region in the application interface that was occupied by the first functional area prior to the scaling and not occupied by the first functional area subsequent to the scaling; and
    responsive to the user dragging a first target functional area from a first location to a second location of the second functional area, switching the locations of the first and second target functional areas.

2. The method of claim 1, wherein:
    the button on the target functional icon is displayed as part of a change operation triggered by the user; and
    the method further comprises: receiving user input pressing and holding the target functional icon to trigger the change operation.

3. The method of claim 1, wherein the first functional area and the second functional area are arranged to occupy different vertical locations of the application interface.

4. The method of claim 1, further comprising: obtaining, from an interface layout server, the layout parameters of the multiple functional areas and the layout parameters of the multiple functional icons, wherein:
    the layout parameters of the multiple functional areas comprise: an ID of each of the functional areas and one or more location parameters of each of the functional areas, and
    the layout parameters of the multiple functional icons comprise: an ID of each of the functional icons, an ID of one of the functional areas in which each of the functional icons is located, and one or more location parameters of each of the functional icons within the functional area in which the functional icon is located.

5. The method of claim 4, wherein generating the application interface, comprises:
    displaying the functional areas in the application interface according to the ID and one or more location parameters of each of the functional areas in the application interface;
    obtaining the functional icons from a locally prestored functional icon database according to the ID of each of the functional icons; and
    displaying the functional icons according to the ID of one of the functional areas in which each of the functional icons is located and the one or more location parameters of each of the functional icons within the functional area in which the function icon is located.

6. The method of claim 4, wherein, before obtaining the layout parameters of the multiple functional areas and the layout parameters of the multiple functional icons, the method further comprises: requesting, in a start process of an application, interface layout parameters for the application from the interface layout server.

7. The method of claim 1, further comprising: after automatically changing the one more location parameters of the first functional area and the one or more location parameters of the second functional area, storing, in the interface layout server, updated layout parameters of the multiple functional areas and updated layout parameters of the multiple functional icons.

8. The method of claim 1, further comprising:
    performing a behavioral analysis of the user based on the layout parameters of the multiple functional areas and the layout parameters of the multiple functional icons; and
    pushing targeted information to the user based on the behavioral analysis.

9. One or more non-transitory computer-readable mediums having executable instructions stored thereon that, when executed by one or more processors, cause a system to perform operations, comprising:
    generating an application interface for a mobile terminal according to layout parameters of multiple functional areas and layout parameters of multiple functional icons, the multiple functional areas comprising a first functional area and a second functional area each including one or more of the multiple functional icons, wherein the multiple functional areas are distinguishable from each other by background colors;
    responsive to a user selecting a button on a target functional icon in the first functional area to delete the target functional icon, and without further user intervention:

automatically changing one or more location parameters of the first functional area to decrease dimensions of the first functional area by scaling the first functional area such that the first functional area does not occupy a region in the application interface that was occupied by the first functional area prior to the scaling, and following the scaling of the first functional area, automatically changing one or more location parameters of the second functional area to move the second functional area such that the second functional area occupies at least part of the region in the application interface that was occupied by the first functional area prior to the scaling and not occupied by the first functional area subsequent to the scaling; and responsive to the user dragging a first target functional area from a first location to a second location of the second functional area, switching the locations of the first and second target functional areas.

10. The one or more non-transitory computer-readable mediums of claim 9, wherein:
the button on the target functional icon is displayed as part of a change operation triggered by the user; and
the operations further comprise: receiving user input pressing and holding the target functional icon to trigger the change operation.

11. The one or more non-transitory computer-readable mediums of claim 9, wherein the first functional area and the second functional area are arranged to occupy different vertical locations of the application interface.

12. The one or more non-transitory computer-readable mediums of claim 9, the operations further comprising:
obtaining, from an interface layout server, the layout parameters of the multiple functional areas and the layout parameters of the multiple functional icons, wherein:
the layout parameters of the multiple functional areas comprise: an ID of each of the functional areas and one or more location parameters of each of the functional areas, and
the layout parameters of the multiple functional icons comprise: an ID of each of the functional icons, an ID of one of the functional areas in which each of the functional icons is located, and one or more location parameters of each of the functional icons within the functional area in which the functional icon is located.

13. The one or more non-transitory computer-readable mediums of claim 12, wherein generating the application interface, comprises:
displaying the functional areas in the application interface according to the ID and one or more location parameters of each of the functional areas in the application interface;
obtaining the functional icons from a locally prestored functional icon database according to the ID of each of the functional icons; and
displaying the functional icons according to the ID of one of the functional areas in which each of the functional icons is located and the one or more location parameters of each of the functional icons within the functional area in which the function icon is located.

14. The one or more non-transitory computer-readable mediums of claim 12, wherein, before obtaining the layout parameters of the multiple functional areas and the layout parameters of the multiple functional icons, the operations further comprise: requesting, in a start process of an application, interface layout parameters for the application from the interface layout server.

15. The one or more non-transitory computer-readable mediums of claim 9, the operations further comprising: after automatically changing the one more location parameters of the first functional area and the one or more location parameters of the second functional area, storing, in the interface layout server, updated layout parameters of the multiple functional areas and updated layout parameters of the multiple functional icons.

16. The one or more non-transitory computer-readable mediums of claim 9, the operations further comprising:
performing a behavioral analysis of the user based on the layout parameters of the multiple functional areas and the layout parameters of the multiple functional icons; and
pushing targeted information to the user based on the behavioral analysis.

17. A system, comprising:
one or more processors; and
one or more non-transitory computer-readable mediums having executable instructions stored thereon that, when executed by the one or more processors, cause the system to perform operations, comprising:
generating an application interface for a mobile terminal according to layout parameters of multiple functional areas and layout parameters of multiple functional icons, the multiple functional areas comprising a first functional area and a second functional area each including one or more of the multiple functional icons, wherein the multiple functional areas are distinguishable from each other by background colors;
responsive to a user selecting a button on a target functional icon in the first functional area to delete the target functional icon, and without further user intervention:
automatically changing one or more location parameters of the first functional area to decrease dimensions of the first functional area by scaling the first functional area such that the first functional area does not occupy a region in the application interface that was occupied by the first functional area prior to the scaling, and
following the scaling of the first functional area, automatically changing one or more location parameters of the second functional area to move the second functional area such that the second functional area occupies at least part of the region in the application interface that was occupied by the first functional area prior to the scaling and not occupied by the first functional area subsequent to the scaling; and
responsive to the user dragging a first target functional area from a first location to a second location of the second functional area, switching the locations of the first and second target functional areas.

18. The system of claim 17, wherein:
the button on the target functional icon is displayed as part of a change operation triggered by the user; and
the operations further comprise: receiving user input pressing and holding the target functional icon to trigger the change operation.

19. The system of claim 17, wherein the first functional area and the second functional area are arranged to occupy different vertical locations of the application interface.

20. The system of claim 17, the operations further comprising:

obtaining, from an interface layout server, the layout parameters of the multiple functional areas and the layout parameters of the multiple functional icons, wherein:

the layout parameters of the multiple functional areas comprise: an ID of each of the functional areas and one or more location parameters of each of the functional areas, and the layout parameters of the multiple functional icons comprise: an ID of each of the functional icons, an ID of one of the functional areas in which each of the functional icons is located, and one or more location parameters of each of the functional icons within the functional area in which the functional icon is located.

\* \* \* \* \*